April 12, 1960   P. MAUBORGNE   2,932,464
BRAKES FOR FISHING REELS
Filed Dec. 18, 1952
FIG_1
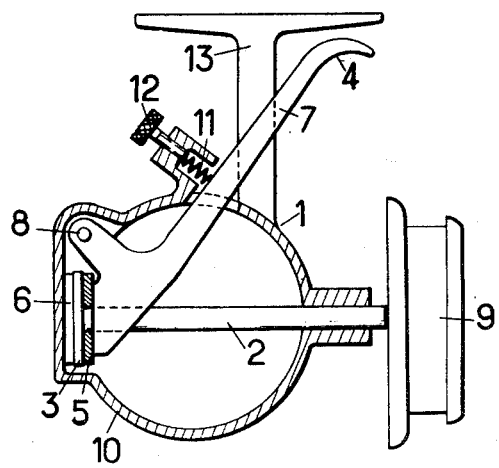
FIG_2
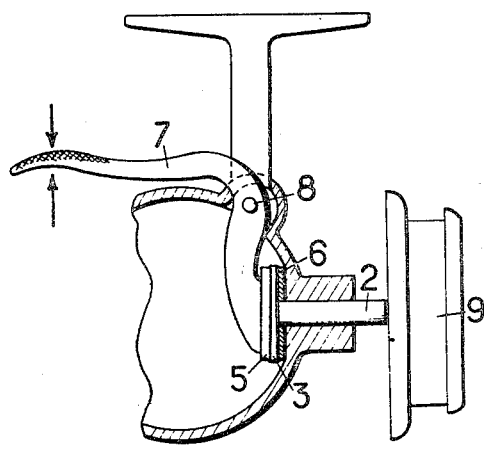
INVENTOR
Paul Mauborgne
By Richard Lord
Ag't

United States Patent Office 2,932,464
Patented Apr. 12, 1960

2,932,464
BRAKES FOR FISHING REELS
Paul Mauborgne, Bernouville (Eure), France
Application December 18, 1952, Serial No. 326,657
Claims priority, application France December 21, 1951
2 Claims. (Cl. 242—84.2)

This invention relates to the braking of fishing reels, and more especially to reels with a fixed drum, that is a drum mounted for free delivery of the line therefrom substantially axially of the drum, the drum being held against free rotation during delivery of the line. For such reels it is essential to be able to vary the braking during the rewinding period, that is to say when one of the angler's hands is occupied with holding the rod, the other hand being occupied with manipulating the crank.

Known devices for fishing reels with a fixed drum, apply a brake at the rear of the drum and permit control of the braking force from behind the reel, not only to obviate the disadvantages and risks of entanglement which are involved in braking devices at the front or through the front, in all types of reels, but also to enable the braking force to be varied as desired at any moment, this force being regulated by one of the fingers of the hand holding the rod.

The object of the present invention, which constitutes an improvement of the device referred to above, is to provide a main brake which is set before the fishing operation proper and which remains fixed during the same, and also means for releasing the initial braking action, at any moment during the fishing operation, the said means being provided in the rear of the reel and being adapted for actuation by one of the fingers of the hand holding the rod.

The object of the invention is attained by the combination of a device which applies the main braking force in an adjustable and permanent manner, and which enables auxiliary braking force to be applied or released as desired at any moment, by the action of one of the fingers holding the rod.

Two examples of embodiments of the invention will now be given but it is not intended to limit the scope of the invention to the specific details chosen for illustration.

In the accompanying diagrammatic drawings:

Figure 1 illustrates the combination of a permanent brake arrangement including a spring, with means for partially or totally releasing this brake arrangement by the action of a lever;

Figure 2 illustrates a form of lever which can be employed in the combination of Fig. 1 according to the invention in order to facilitate manipulation by any one of the fingers of the hand holding the rod.

In Figure 1, which is a diagrammatic axial section, the casing of a fishing reel 1 is indicated by the numeral 10 and is secured to a fishing rod (not shown) by means of a bracket 13. In Fig. 1, as in Fig. 2 which is hereinafter referred to in detail, only those parts of the reel structure that are necessary to an understanding of the present invention have been illustrated. The reels to which the invention relates are of the kind wherein the drum or spool carrying the fishing line is stationary during a cast or unwinding of the line and, as is usual, the reel 1 includes a drum or spool 9 integral with a shaft 2 carrying a disc 3 at one end within the casing 10. The disc 3 is in frictional contact with a disc 6 on the casing 10, the disc 6 being non-rotatable and formed of any material suitable for braking, for example, a self-lubricating material. A washer 5 is disposed on shaft 2 at the side of disc 3 facing away from disc 6, and a lever 7 which is pivoted on the casing 10, as at 8, is adapted to bear against the washer 5 in the axial direction toward the disc 3 so that the latter is urged into braking engagement with the disc 6. The lever 7 is subject to the action of a spring 11, the tension of which can be adjusted by means of a screw 12. By acting with one finger of the hand holding the rod at the point 4 of lever 7 the pressure of the latter against washer 5 is diminished and the braking action is correspondingly decreased.

In Figure 2 there is simply illustrated the possibility of giving the lever 7 a bent shape, so as to enable any one of the fingers, or even more than one finger of the hand holding the rod, to operate the lever 7. In this figure the combination of the lever 7 with one or more springs is not illustrated, since the combination may be the same as that indicated in the preceding figure.

What I claim is:

1. In a fishing reel including a normally stationary drum adapted to hold a line and fixedly mounted on a shaft, a housing, mounting means for rotatably mounting said shaft in said housing in juxtaposition to a fishing rod with the axis of said shaft parallel to the longitudinal axis of the rod, and frictional braking means to hold the drum against rotation; the combination of biasing means to urge said braking means into frictional engagement, and an actuating member having a manual control portion extending to a location in the vicinity of the rod for manipulation by a finger of the hand holding the rod and movable in a predetermined direction between first and second positions thereof, said first position being nearer the axis of said shaft than said second position, and said second position being nearer said rod than said first position, said predetermined direction being substantially parallel to the plane defined by the axes of said shaft and of said rod, said actuating member, when actuated, being operative to reduce the degree of frictional engagement of said braking means in opposition to said biasing means.

2. In a fishing reel including a normally stationary drum adapted to hold a line and fixedly mounted on a shaft, a housing, mounting means for rotatably mounting said shaft in said housing in juxtaposition to a fishing rod with the axis of said shaft parallel to the longitudianl axis of the rod, and frictional braking means to hold the drum against rotation; the combination of a lever pivoted on an axis mounted on said housing, biasing means to urge said braking means, by means of said lever, into frictional engagement, said lever having a manual control portion extending to a location in the vicinity of the rod for manipulation by a finger of the hand holding the rod and movable in a predetermined direction between first and second positions thereof, said first position being nearer the axis of said shaft than said second position, and said second position being nearer said rod than said first position, said predetermined direction being substantially parallel to the plane defined by the axes of said shaft and of said rod, said lever, when manipulated, being operative to reduce the degree of frictional engagement of said braking means in opposition to said braking means.

References Cited in the file of this patent

UNITED STATES PATENTS

| | | |
|---|---|---|
| 2,208,493 | Brett | July 16, 1940 |
| 2,583,465 | Brown | Jan. 22, 1952 |
| 2,608,358 | Kadets et al. | Aug. 26, 1952 |
| 2,624,523 | Sawitzke | Jan. 6, 1953 |

FOREIGN PATENTS

| | | |
|---|---|---|
| 470,695 | Great Britain | Aug. 19, 1937 |
| 615,340 | Great Britain | Jan. 5, 1949 |
| 921,411 | France | Jan. 13, 1947 |